(12) United States Patent
Roberts

(10) Patent No.: US 7,499,039 B2
(45) Date of Patent: Mar. 3, 2009

(54) ITERATIVE METHOD FOR DETERMINING TOUCH LOCATION

(75) Inventor: Jerry B. Roberts, Arlington, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 635 days.

(21) Appl. No.: 11/032,572

(22) Filed: Jan. 10, 2005

(65) Prior Publication Data

US 2006/0152499 A1 Jul. 13, 2006

(51) Int. Cl.
G06F 3/043 (2006.01)

(52) U.S. Cl. .................. 345/177; 345/156; 345/173; 178/18.01; 178/18.03; 178/18.04

(58) Field of Classification Search .......... 345/156, 345/173, 177; 178/18.01, 18.03, 18.04
See application file for complete search history.

(56) References Cited

U.S. PATENT DOCUMENTS

| | | | |
|---|---|---|---|
| 4,458,328 A * | 7/1984 | Kino et al. ............. 708/819 |
| 4,745,565 A | 5/1988 | Garwin et al. |
| 5,231,381 A | 7/1993 | Duwaer |
| 5,237,879 A | 8/1993 | Speeter |
| 5,420,804 A * | 5/1995 | Tanaka et al. ........... 702/95 |
| 5,543,589 A | 8/1996 | Buchana et al. |
| 5,563,632 A | 10/1996 | Roberts |
| 5,570,813 A | 11/1996 | Clark, II |
| 5,670,755 A | 9/1997 | Kwon |
| 5,691,959 A * | 11/1997 | Kriewall et al. ........ 367/129 |
| 5,717,432 A | 2/1998 | Miwa et al. |
| 5,777,607 A | 7/1998 | Koolen |
| 5,801,682 A | 9/1998 | Coni et al. |
| 6,492,979 B1 | 12/2002 | Kent et al. |
| 6,504,530 B1 | 1/2003 | Wilson et al. |
| 6,871,149 B2 | 3/2005 | Sullivan et al. |
| 7,157,649 B2 * | 1/2007 | Hill ..................... 178/18.04 |
| 7,176,897 B2 * | 2/2007 | Roberts ................. 345/173 |
| 7,315,300 B2 * | 1/2008 | Hill et al. ............... 345/173 |
| 2001/0006006 A1 | 7/2001 | Hill |
| 2003/0217873 A1 | 11/2003 | Paradiso et al. |
| 2004/0160421 A1 * | 8/2004 | Sullivan ................. 345/173 |
| 2004/0233174 A1 | 11/2004 | Robrecht et al. |
| 2006/0139339 A1 * | 6/2006 | Pechman et al. .......... 345/177 |

FOREIGN PATENT DOCUMENTS

| WO | WO 01/48684 | * | 7/2001 |
| WO | WO 03/005292 | * | 1/2003 |

OTHER PUBLICATIONS

U.S. Appl. No. 10/750,502; Touch Sensitive Device Employing Bending Wave Vibration Sensing and Excitation Transducers; Nicholas P.R. Hill and Darius M. Sullivan; filed Dec. 31, 2003.

* cited by examiner

Primary Examiner—My-Chau T Tran
(74) Attorney, Agent, or Firm—Steven A. Bern

(57) ABSTRACT

A touch sensitive device uses an iterative method for determining the location of a touch on a touch sensitive surface. The touch sensitive device includes a touch plate and a plurality of sensors configured to sense vibrations propagating in the touch plate. Signals responsive to the vibrations caused by the touch are generated. The touch location is approximated and the signals are adjusted using the approximate touch location. The touch location is determined using the adjusted signals.

21 Claims, 8 Drawing Sheets

ITERATIVE METHOD FOR DETERMINING TOUCH LOCATION

The present invention relates to touch sensitive devices and, more particularly, to methods for determining a touch location.

BACKGROUND

A touch sensitive device offers a simple, intuitive interface to a computer or other data processing device. Rather than using a keyboard to type in data, a user can transfer information by touching an icon or by writing or drawing on a touch sensitive panel. Touch panels are used in a variety of information processing applications. Interactive visual displays often include some form of touch sensitive panel. Integrating touch sensitive panels with visual displays is becoming more common with the emergence of next generation portable multimedia devices such as cellphones, personal data assistants (PDAs), and handheld or laptop computers.

Various methods have been used to determine touch location, including capacitive, resistive, acoustic and infrared techniques. One touch detection technology, referred to as Surface Acoustic Wave (SAW), uses high frequency waves propagating on the surface of a glass screen. Attenuation of the waves resulting from contact of a finger with the glass screen surface is used to detect touch location. SAW employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

Another type of touch detection technology involves sensing certain vibrations created by a touch in the bulk material of the touch sensitive substrate. These vibrations are denoted bending waves and may be detected using sensors typically placed on the edges of the substrate. Signals generated by the sensors are analyzed to determine the touch location. Bending wave touch technology is particularly useful for applications where the touch panel may become dirty or scratched because such interferences do not significantly degrade touch location performance.

In many applications, such as signature capture, or electronic tablets, accuracy in determining the location of the touch is an important factor. Further, there is a need to enhance both accuracy and speed of touch location determination in small devices, such as handheld units. The present invention addresses these and other needs.

SUMMARY OF THE INVENTION

Embodiments of the present invention are directed to methods and devices for determining the location of a touch on a touch sensitive device. One embodiment of the invention involves a method for detecting a touch location on a touch sensitive device. The touch sensitive device includes a touch plate and a plurality of vibration sensors configured to sense vibrations propagating in the touch plate. Signals responsive to the vibrations caused by the touch are generated. The touch location is approximated and the signals are adjusted using the approximate touch location. The touch location is determined using the adjusted signals.

Determination of the touch location may involve iteratively determining the touch location. In one example, iteratively determining the touch location may involve iterating to a predetermined touch location accuracy. In another example, iteratively determining the touch location may involve iteratively adjusting the signals towards an exact reconstruction. The touch location may be approximated by defining a plurality of possible touch locations and adjusting the signals using each of the possible touch locations. The approximate touch location may be determined as one of the possible touch locations using the adjusted signals. The plurality of possible touch locations may be defined by an array of possible touch locations. In one example, the array is sized to cover an active area of the touch screen.

Another embodiment of the invention is directed to a touch sensing device. The touch sensing device includes a touch plate and a plurality of touch sensors coupled to the touch plate. The touch sensors are configured to generate signals responsive to vibrations caused by a touch on the touch plate. A touch location processor is coupled to the plurality of sensors. The touch location processor is configured to approximate the touch location, adjust the signals using the approximate touch location, and determine the touch location using the adjusted signals.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 1 a graphically shows two impulse responses in an ideal medium with a square root dispersion relation;

FIG. 1b graphically shows the frequency response of the dispersive impulse response of FIG. 1a obtained by taking the Fourier Transform of the impulse response of FIG. 1a;

Figure 1A:
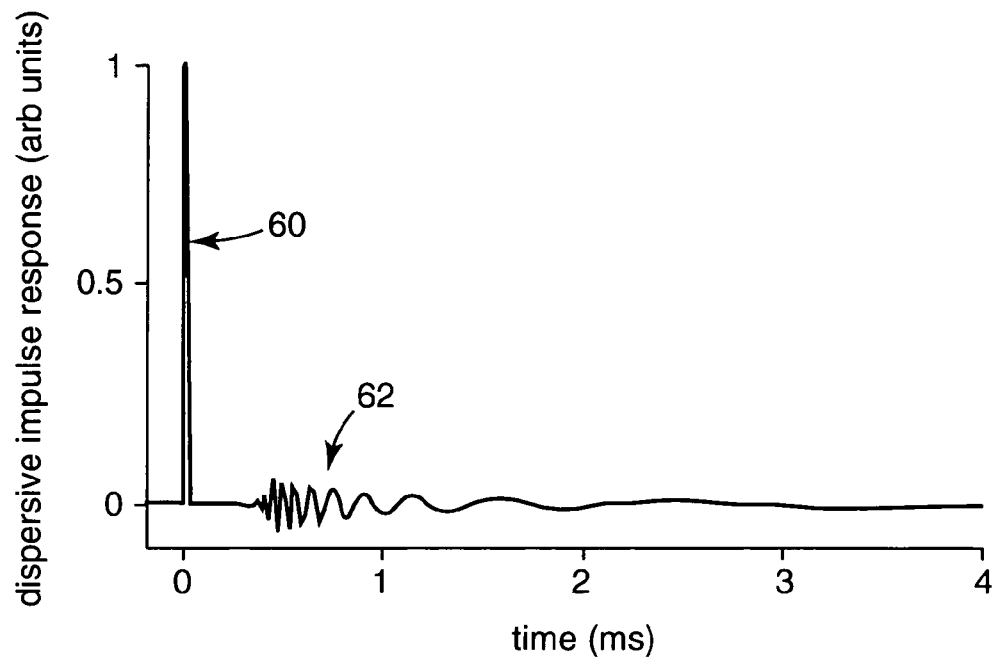

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention relates to touch activated, user interactive devices that sense vibrations that propagate through a touch substrate and are sensed by a number of touch transducers. More particularly, the present invention relates to a bending wave vibration touch sensing apparatus that uses an iterative method for enhancing the accuracy of touch location determinations.

An iterative approach to touch location determination provides for a number of enhanced capabilities. For example, an approximate touch location acquired using a simple computation can be used to inform a more accurate touch location analysis via an iterative process. The approximate or intermediate touch locations can be used to iteratively adjust the sensor signals such that the accuracy of the simple computation can be increased.

Other touch location methods determine the touch location to an accuracy that is limited by the characteristics of the touch location technique used. The touch location processes of the present invention provide the capability of iterating towards an exact reconstruction of the source waveforms. Thus, use of the iterative technique described herein allows the touch location to be determined to a desired or required level of accuracy.

These and other advantageous features and capabilities are illustrated below in greater detail. A touch sensing apparatus implemented in accordance with the embodiments of the present invention may incorporate one or more of the features, structures, methods, or combinations thereof described herein. It is intended that such a device or method need not include all of the features and functions described herein, but may be implemented to include selected features and functions that, in combination, provide for unique structures and/or functionality.

In vibration sensing touch input devices that include piezoelectric sensors, for example, vibrations propagating in the plane of the touch panel plate stress the piezoelectric sensors, causing a detectable voltage change across the sensor. The signal received can be caused by a vibration resulting directly from the impact of a direct touch input or the input of energy with a trace (friction), or by a touch input influencing an existing vibration, for example by attenuation of the vibration. The signal received can also be caused by an unintended touch input, such as a touch input resulting from user handling or mishandling of the touch input device, or from environmental sources external to, but sensed by, the touch input device.

According to one touch sensing approach, denoted the "time-of-flight" approach, the differential times at which the same signal is received at each of a number of sensors positioned relative to the touch sensing surface can be used to deduce the location of the touch input. When the propagation medium is a frequency dispersive medium, the vibration wave packet, which is composed of multiple frequencies, becomes spread out and attenuated as it propagates, making interpretation of the signal more difficult. As such, approaches have been proposed to convert the received signals so they can be interpreted as if they were propagated in a non-dispersive medium. Such a technique is particularly suited to systems that detect bending wave vibrations, such as lowest-order anti-symmetric Lamb waves.

Techniques for addressing vibration wave packet dispersion and producing representative signals corrected for such dispersion are disclosed in International Publications WO 2003/005292 and WO 01/48684; U.S. patent application Ser. No. 09/746,405 filed Dec. 26, 2000; U.S. Provisional Application 60/432,024 filed Dec. 10, 2002; and in commonly owned U.S. patent application Ser. No. 10/440,650, each of which is incorporated herein by reference.

The term bending wave vibration refers to an excitation, for example by the contact, which imparts some out of plane displacement to a member capable to supporting bending wave vibrations. Materials may transmit waves in any of a number of modes, both bending and others. The lowest-order anti-symmetric Lamb mode, which may be taken here as exemplary, is but one of the bending modes. A dispersion relation describes the dependence of the propagation velocity in a mode of interest on the frequency of the waves in that mode. For the lowest-order anti-symmetric Lamb mode, this dispersion relation is one typified by a propagation velocity that rises in proportion to the square root of frequency. This relation may obtain accurately over a wide range of frequencies, although it deviates from the pure square root at sufficiently high frequency, where the associated wavelength is no longer large compared to the material thickness. Also, other modes of propagation, to which the method of the invention may also be applied, may have other dispersion relations.

For purposes of enhancing an understanding of vibration wave packet dispersion and producing representative signals corrected for such dispersion, reference is made to FIGS. 1a-1d. FIG. 1a shows an impulse in an ideal medium with a square root dispersion relation and demonstrates that a dispersive medium does not preserve the waveshape of an impulse. An outgoing wave 60, as measured at its source point, is a non-dispersed impulse applied at $t_0=0$. A signal 62 as received at a sensor some distance away, however, exhibits a dispersive impulse response that is spread out over time. This makes a determination of the intervening distance, and therefore of an exact contact position, problematic.

Figure 1B:
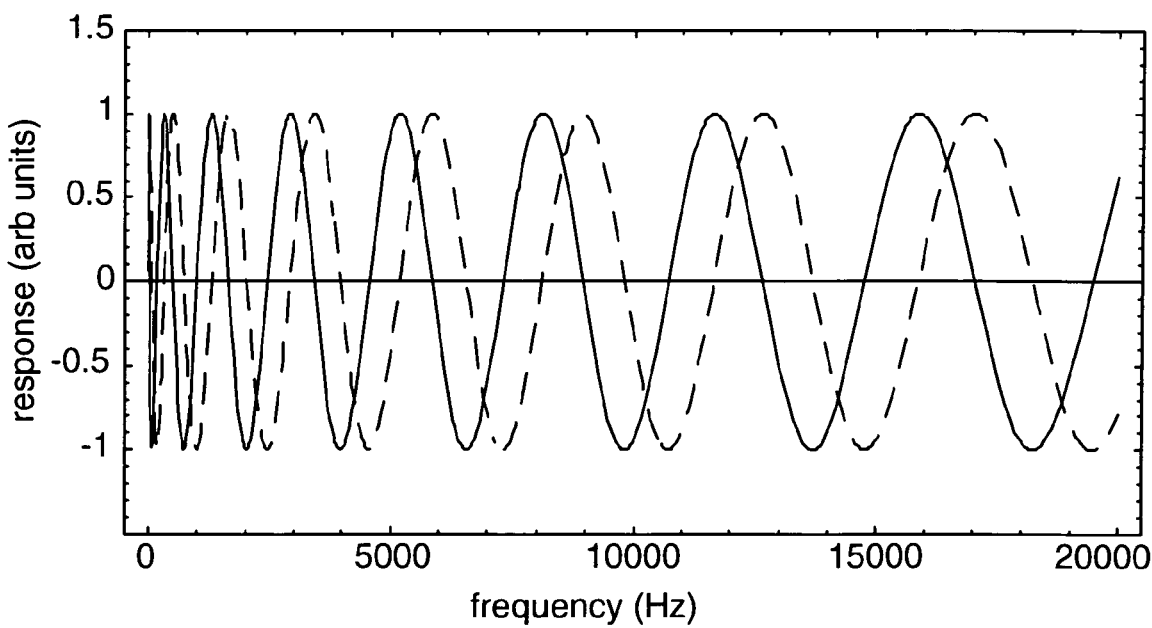

Calculating the Fourier transform of the dispersive impulse response 62 of FIG. 1a produces the frequency domain representation shown in FIG. 1b, where the solid curve depicts the real part of the transform, and the dashed curve the imaginary part. The cyclic phase rotation may be noted to proceed at a decreasing rate with increasing frequency. This is a consequence of the square root dispersion in which the phase velocity is proportional to the square root of the frequency. Since the group delay is proportional to the rate of change of phase with frequency, propagation of the impulse as a compact event in time is communicated in less time at higher frequencies. The effect of the panel on the signal is thus to smear out its arrival time as a function of frequency, as seen at 62 in FIG. 1a. The smeared out response of the bending wave makes accurately determining the touch location more difficult.

The frequency domain representation of FIG. 1b, however, may be manipulated to restore a linear relationship of phase to frequency. This may be accomplished by either a technique of frequency warping, or by a technique of phase correction—in particular, by an iterative technique of phase correction as described hereinafter, which iterative technique is exemplary of the more general iterative technique of the invention.

Figure 1C:
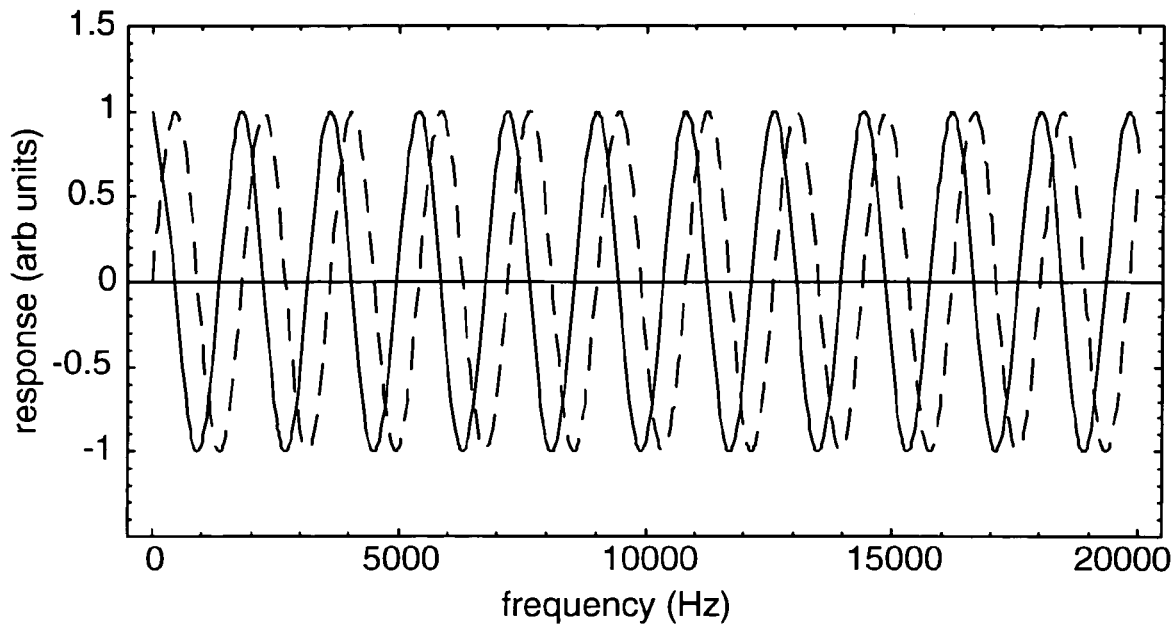
FIG. 1c graphically shows a dispersion corrected transformation of the dispersive frequency response shown in FIG. 1b obtained either by warping the frequency axis or by applying the inverse phase of the touch panel dispersion.

The resulting dispersion corrected frequency domain representation of signal 62 is depicted in FIG. 1c. The constant rate of phase rotation versus frequency seen here is characteristic of a single group delay. This delay, in turn, corresponds to the propagation time of the signal for the effective velocity $V_0$ to which the correction has been referenced, as explained below.

Figure 1D:
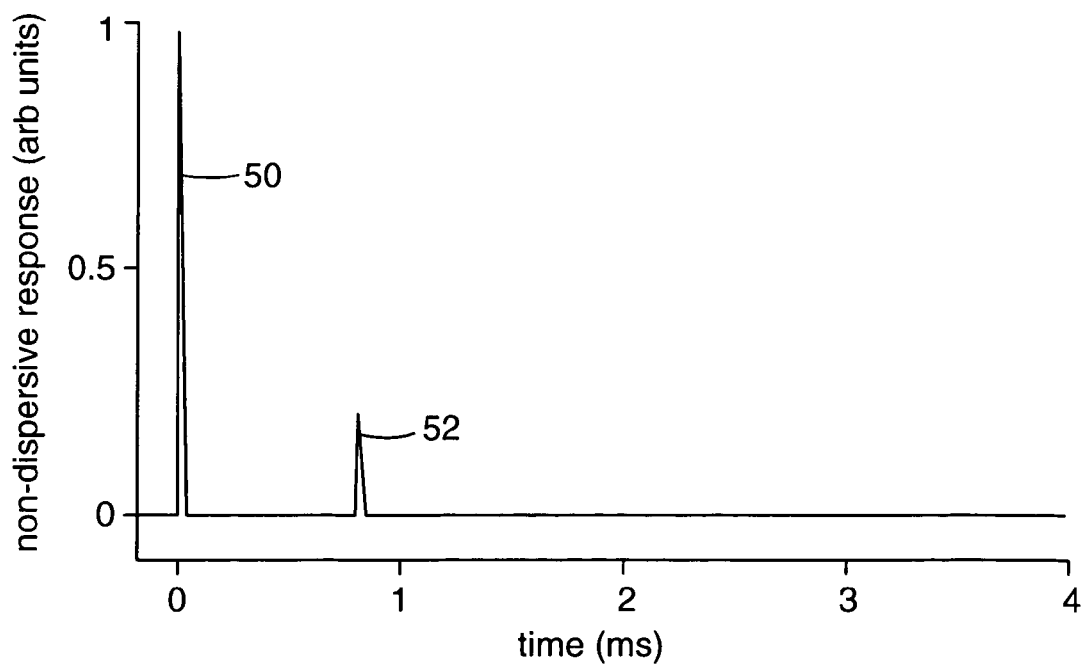
FIG. 1d shows a non-dispersive impulse response produced by applying the inverse Fast Fourier Transform (FFT) to the trace of FIG. 1c, which has been corrected for dispersion.

Turning to FIG. 1d, the dispersion corrected time signal 52 may be recovered by performing the inverse Fourier transform upon the corrected frequency domain representation of FIG. 1c. The propagation time for the signal at the effective velocity $V_0$ is the interval between corrected time signal 52 and the applied source waveform 50, shown superimposed for reference. Although a touch-locating device may not have direct knowledge of the contact time at which the source waveform 50 begins propagating, an accurate touch location may be derived. In one approach, the arrival times 52 are derived for dispersion-corrected signals from three or more sensors, and the arrival-time differences for at least two different pairings of these signals used to construct hyperbolae that intersect at the touch location. In the case of tap-touches with an impulsive character, individual arrival times may be determined for each sensor, and pairs of these numbers subtracted to obtain the desired arrival-time differences. A continuous source, such as the noise generated at the tip of a dragging stylus, may also be located. Since the dispersion-corrected waveforms reconstructed at each sensor are nominally identical—except for the variations in arrival delay—the relative delay of a pair may be determined by cross-correlating the corrected waveforms. A sharp peak in the correlation function may be expected at a time offset corresponding to the relative delay.

As disclosed elsewhere, a frequency-warping procedure may be employed to achieve a dispersion corrected correlation function. A dispersion corrected correlation function may be employed directly—that is, non-iteratively—in situations where neither the sensor-to-contact distance, nor the contact time $t_0$, are known a priori. According to one approach, a first sensor mounted on a structure capable of supporting bending waves measures a first measured bending wave signal. A second sensor is mounted on the structure to determine a second measured bending wave signal. The second measured bending wave signal is measured simultaneously with the first measured bending wave signal. A dispersion corrected function of the two measured bending wave signals is calculated, which may be a dispersion corrected correlation function, a dispersion corrected convolution function, a dispersion corrected coherence function or other phase equivalent function. The measured bending wave signals are processed to calculate information relating to the contact by applying the dispersion corrected function. Details concerning this approach are disclosed in previously incorporated PCT application 01/48684 and U.S. patent application Ser. No. 09/746,405.

The frequency-warping approach to dispersion correction, however, has the disadvantage of working ideally only for a touch disturbance waveform that originates as a perfect, infinite bandwidth impulse. Since frequency-warping moves energy across frequencies, the reconstructed source waveforms for all other sources are somewhat distorted. Phase correction does not have this problem, and so may have the potential for higher accuracy. While the phase correction approach provides a true inverse to the dispersion distortion of the signal, it cannot be applied without already knowing the distance the signal has travelled. It is this problem of needing to know the answer first in order to find the answer that the iterative approach addresses. When applied as disclosed herein, iteration may converge toward the exact reconstruction of an arbitrary source waveform.

Figure 2:
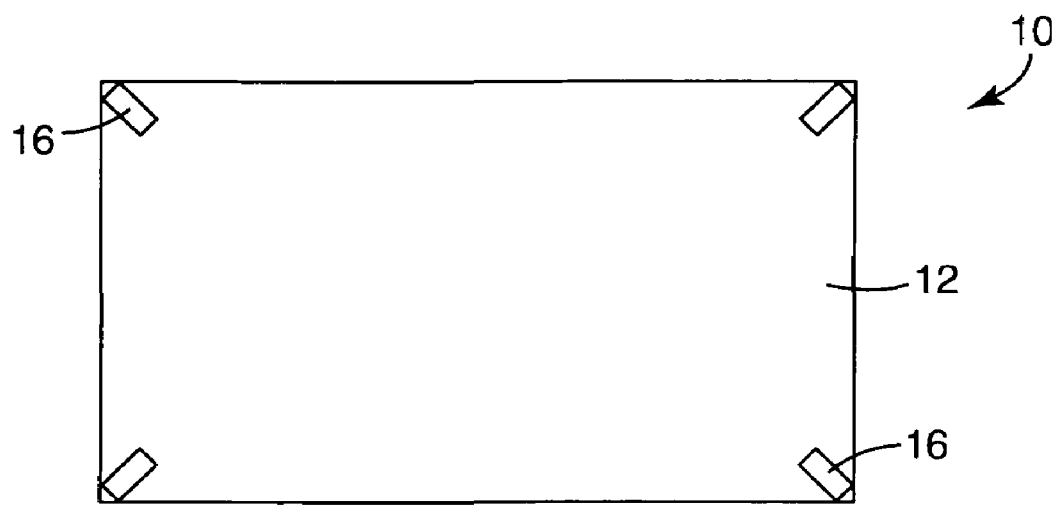
FIG. 2 illustrates one configuration of a touch sensitive device that incorporates features and functionality for detecting bending wave vibrations in accordance with an embodiment of the present invention.

Turning now to FIG. 2, there is illustrated one configuration of a touch sensitive device 10 that incorporates features and functionality for detecting bending wave vibrations. According to this embodiment, the touch sensitive device 10 includes a touch substrate 12 and vibration sensors 16 coupled to an upper surface of the touch substrate 12. In this illustrative example, the upper surface of the touch substrate 12 defines a touch sensitive surface. Although sensors 16 are shown coupled to the upper surface of the touch substrate 12, the sensors 16 can alternatively be coupled to the lower surface of the touch substrate 12. In another embodiment, one or more sensors 16 may be coupled to the upper surface while one or more other sensors 16 may be coupled to the lower surface of the touch substrate 12.

Touch substrate 12 may be any substrate that supports vibrations of interest, such as bending wave vibrations. Exemplary substrates 12 include plastics such as acrylics or polycarbonates, glass, or other suitable materials. Touch substrate 12 can be transparent or opaque, and can optionally include or incorporate other layers or support additional functionalities. For example, touch substrate 12 can provide scratch resistance, smudge resistance, glare reduction, anti-reflection properties, light control for directionality or privacy, filtering, polarization, optical compensation, frictional texturing, coloration, graphical images, and the like.

In general, the touch sensitive device 10 includes at least three sensors 16 to determine the position of a touch input in two dimensions, and four sensors 16 may be desirable in some embodiments, as discussed in International Publications WO 2003 005292 and WO 0148684, and in commonly-assigned U.S. patent application Ser. No. 09/746,405. In the present invention, sensors 16 are preferably piezoelectric sensors that can sense vibrations indicative of a touch input to touch substrate 12. Useful piezoelectric sensors include unimorph and bimorph piezoelectric sensors. Piezoelectric sensors offer a number of advantageous features, including, for example, good sensitivity, relative low cost, adequate robustness, potentially small form factor, adequate stability, and linearity of response. Other sensors that can be used in vibration sensing touch sensitive devices 10 include electrostrictive, magnetostrictive, piezoresistive, acoustic, and moving coil transducers/devices, among others.

In one embodiment, all of the sensors 16 are configured to sense vibrations in the touch substrate 12. In another embodiment, one or more of the sensors 16 can be used as an emitter device to emit a signal that can be sensed by the other sensors 16 to be used as a reference signal or to create vibrations that can be altered under a touch input, such altered vibrations being sensed by the sensors 16 to determine the position of the touch. An electrodynamic transducer may be used as a suitable emitter device. Moreover, one or more of the sensors 16 can be configured as a dual purpose sense and excitation transducer. Sensors 16 can be affixed or bonded to touch substrate 12 by any suitable means, such as by use of an adhesive. Touch location approaches incorporating the use of one or more emitter transducers are described in commonly owned U.S. patent application Ser. No. 10/750,502, which is incorporated herein by reference.

In a configuration in which the touch sensitive device 10 employs a dual active and passive sensor 16, this sensor 16 may be adapted to switch between active and passive sensing modes depending on whether contact is applied to the touch substrate 12. The touch sensitive device 10 may cycle between resting in passive sensing mode when no contact is detected, switching to active mode sensing when a contact is applied, and returning to passive sensing mode once the contact is removed to await further contacts. This may be advantageous to avoid power drain when the touch sensitive device 10 is unnecessarily in active mode.

Many applications that employ touch sensitive devices 10 also use electronic displays to display information through the touch sensitive devices 10. Since displays are typically rectangular, it is typical and convenient to use rectangular touch sensitive devices 10. As such, the touch substrate 12 to which the sensors 16 are affixed is typically rectangular in shape. Alternatively, the touch substrate 12 may have a more complex shape, for example a curved surface and/or variable thickness. In the case of touch substrate 12 having a complex shape, an adaptive algorithm (e.g., neural net) may be used to decipher the contact location from the bending wave signals received by the sensors 16.

According to one configuration, the sensors 16 are preferably placed near the corners of the touch substrate 12. Because many applications call for a display to be viewed through the touch sensitive devices 10, it is desirable to place the sensors near the edges of the touch substrate 12 so that they do not undesirably encroach on the viewable display area. Placement of the sensors 16 at the corners of a touch substrate 12 can also reduce the influence of reflections from the panel edges.

The contact sensed by the touch sensitive device 10 may be in the form of a touch from a stylus which may be in the form of a hand-held pen. The movement of a stylus on the touch substrate 12 may generate a continuous signal which is affected by the location, pressure and speed of the stylus on the touch substrate 12. The stylus may have a flexible tip, e.g. of rubber, which generates bending waves in the touch substrate 12 by applying a variable force thereto. The variable force may be provided by the tip, which alternatively adheres to or slips across a surface of the touch substrate 12. Alternatively, the contact may be in the form of a touch from a finger that may generate bending waves in the touch substrate 12, which may be detected by passive and/or active sensing. The bending waves may have frequency components in the ultrasonic region (e.g., >20 kHz).

Figure 3:
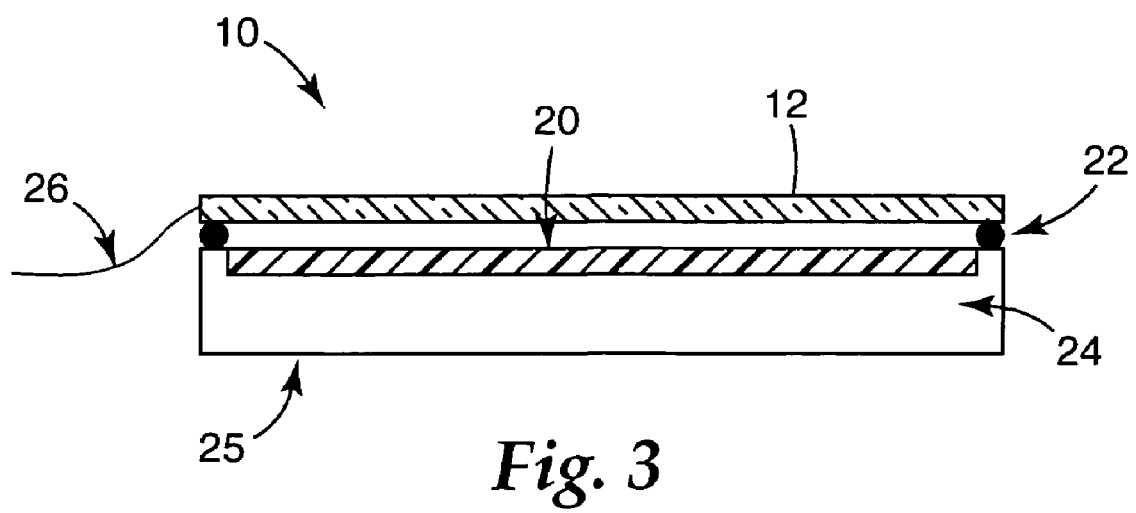
FIG. 3 is a sectional view of a touch sensitive device mounted to a display in accordance with an embodiment of the present invention.

FIG. 3 is a sectional view of a touch sensitive device 10 mounted to a display 25. The display 25 may be any suitable electronic display, such as a liquid crystal display (LCD), an electroluminescent display, a cathode ray tube display, a plasma display, a light emitting diode display, and the like. The display 25 may additionally or alternatively include static graphics that can be permanent or replaceable. The touch sensitive device 10 of the type illustrated in FIG. 3 includes a transparent substrate 12 mounted in front of an LCD screen 20.

The LCD screen 20 is mounted to a frame 24 of the LCD display 25. In one configuration, a foam gasket or mounting 22 may be attached to the underside of the substrate 12, extending substantially around the periphery of the substrate 12. The foam gasket 22 may have adhesive surfaces for securing to one or both of the substrate 12 and the frame 24. The foam gasket 22 may reduce reflections of touch-induced vibrations from the edge of the substrate 12 as well as isolate the substrate 12 from external vibrations. Foam gasketing and other gasketing and vibration damping or isolation can be provided by other and/or additional means, including placing a foam gasket between the substrate 12 and a bezel (not shown). A tail connector 26 of the touch sensitive device 10 may be connected to a controller of the touch sensitive device 10.

Figure 4:
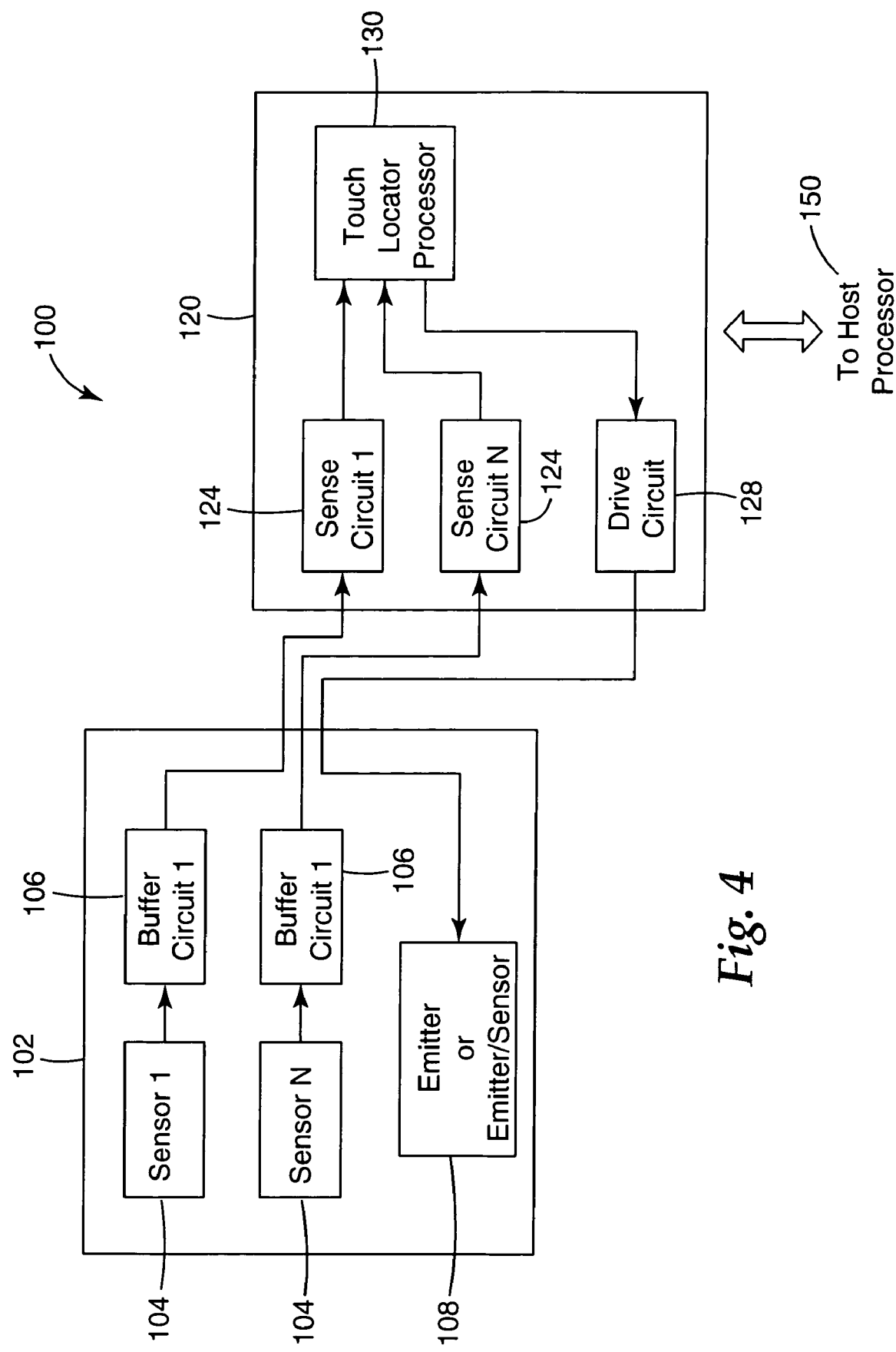
FIG. 4 is a depiction of a touch panel system that includes a touch sensitive device and a touch panel controller in accordance with an embodiment of the present invention.

FIG. 4 is a depiction of a touch panel system 100 that includes a touch sensitive device 102 and a touch panel controller 120. The touch sensitive device 102 includes at least three sensors 104, preferably four sensors 104, each coupled to an associated buffer circuit 106. The touch sensitive device 102 may further include at least one emitter transducer 108. The emitter transducer 108 may be configured to operate only as an excitation transducer or as a dual emitter/sensor transducer. Each of the buffer circuits 106 and emitter transducer 108 is coupled to the controller 120.

The controller 120 includes sense circuits 124 each coupled to one of the sensor/buffer circuit combinations 104/106. The sense circuits 124 typically include one or more of amplification, conditioning, and filtering circuitry. The emitter transducer 108, if used, is coupled to a drive circuit 128 that generates signals that cause the emitter transducer 108 to generate predetermined excitation signals that are imparted to the substrate of the touch sensitive device 102. Each of the drive circuit 128 and sense circuits 124 is coupled to a touch location processor 130. The touch location processor 130 typically includes an analog signal conditioning stage, an analog-to-digital converter (ADC) sampling at an appropriate sampling frequency (e.g., 200 kHz), and a digital signal processor (DSP) that implements coordinate location algorithm/firmware and other algorithms and routines.

Figure 5:
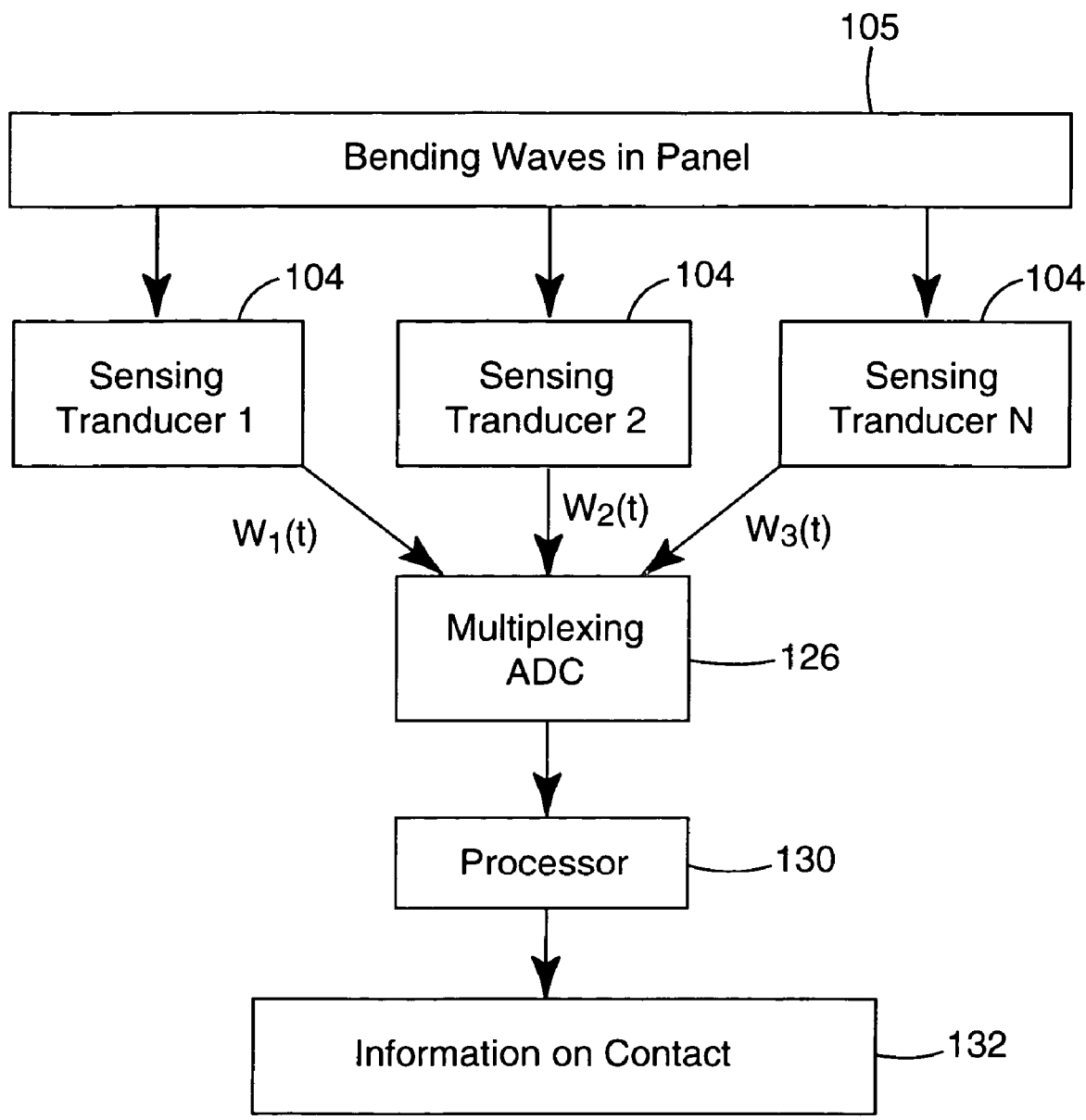
FIG. 5 illustrates an implementation for processing bending wave information obtained at each of a number of pickup sensors in accordance with an embodiment of the present invention.

For example, and with reference to FIG. 5, one implementation for processing of bending wave information sensed at each sensor 104 of FIG. 4 is illustrated. In FIG. 5, the bending waves in the panel 105 are sensed by at least three and preferably four sensors 104. The sensors 104 measure analog bending wave signals $W_1(t)$, $W_2(t)$ ... $W_N(t)$, which are transmitted to a multiplexing ADC 126. The resultant digital input signal is transmitted to a touch location processor 130 from which information 132 relating to the location and profile of the contact impulse is determined.

The touch location may be determined based on the time of flight of the bending wave signals, $W_1(t)$, $W_2(t)$ ... $W_N(t)$ to the sensors with or without dispersion correction. However, accurately computing the location from the sensor signals alone may be arduous. In accordance with embodiments of the invention, a simple but effective method of computing touch location involves using knowledge of an approximate or estimated touch location to adjust the bending wave signals $W_1(t)$, $W_2(t)$ ... $W_N(t)$ for increased touch location accuracy. The computational approach employed by the embodiments of the invention are based on the assertion that computing the bending wave signals given an approximated touch location may be a simpler and/or more accurate process than computing the touch location given the signals.

Figure 6:
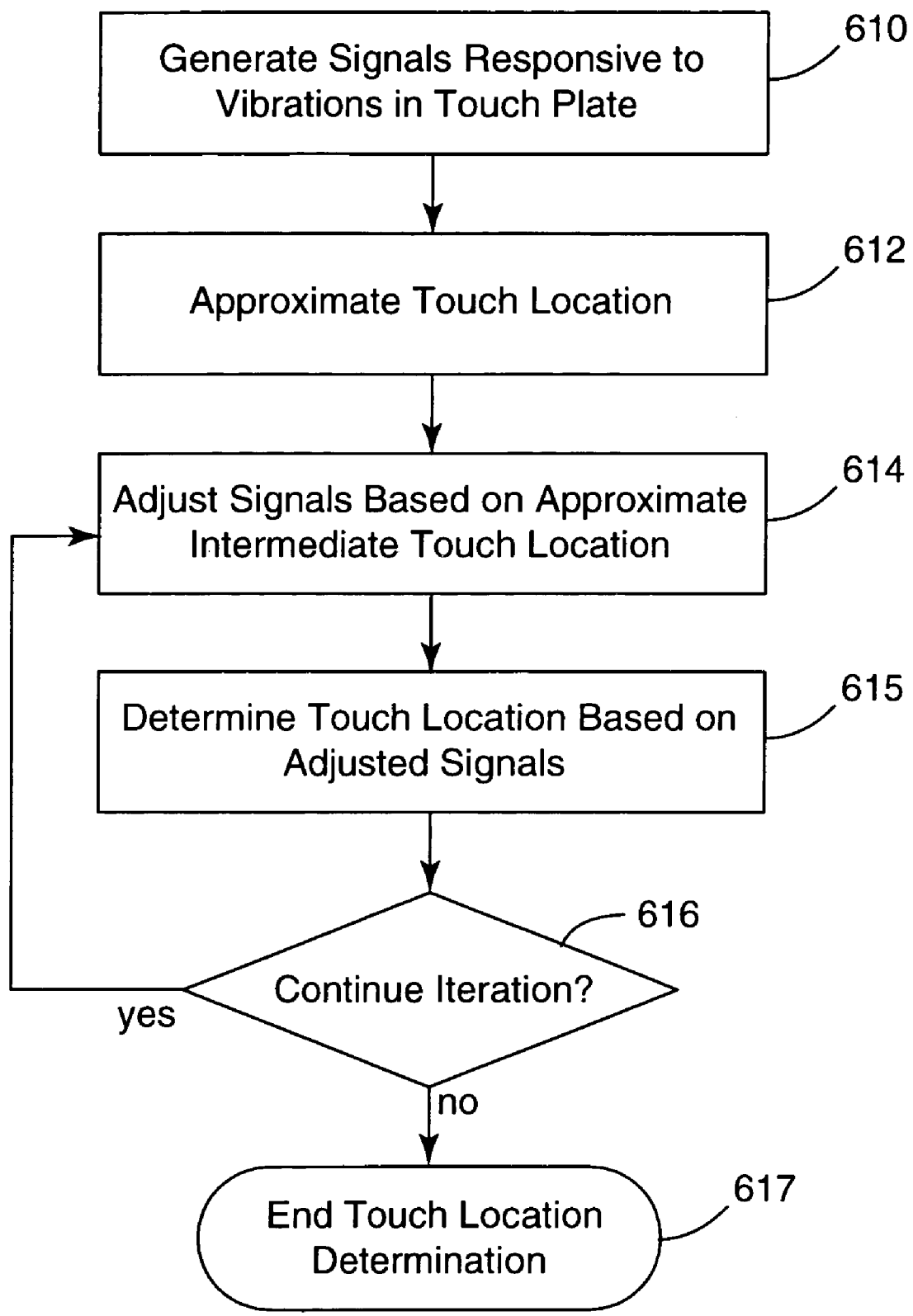
FIGS. 6 and 7 are flowcharts illustrating methods of touch location determination in accordance with embodiments of the invention.

The flowchart of FIG. 6 illustrates a method of touch location determination in accordance with embodiments of the invention. Touch location signals are generated 610 in response to vibrations created by a touch on a touch plate such as by the processes described above. An approximate touch location of the touch is determined 612. The approximate touch location may be an arbitrarily selected location, may be based on the generated signals, or may be approximated by other methods. In one scenario, a first type of touch technology may be used to approximate the touch location and a second type of touch technology may be used to more accurately determine the touch location through the iterative process.

The generated signals are adjusted 614 based on the approximate touch location. The touch location is calculated 615 based on the adjusted signals. The iteration may continue 616 by using the newly determined intermediate touch location to again adjust 614 the signals, recalculating 615 the touch location for any number of iterations. The iterative process may be repeated for multiple cycles to achieve a desired or required touch location accuracy. Upon completion of the requisite number of cycles or upon achieving the desired accuracy, the touch location algorithm ends 617, returning the last touch location determined by the iterative process.

As previously mentioned, the procedures outlined herein may be employed for touch location determination based on the time-of-flight of an acoustic touch disturbance in a dispersive medium. Such an implementation might comprise, for example, measurement of the arrival of asymmetric bending waves at the corners of a glass touch plate.

As is known in the art, an approximate location may be computed by determining the arrival-time differences of the bending wave signals at various pairs of sensors. These time differences may be associated with distance differences by assuming a typical speed of propagation. Such distance differences then define hyperbolic curves that may be intersected to determine an approximate touch location. Since the speed of bending wave propagation is a function of frequency, however, both the time differences and the typical speed of propagation may not be sharply defined, thus limiting accuracy.

The method of the invention may be applied by retaining a representation of the signals used for the above approximate determination, adjusting this representation based upon the approximate location first determined, then repeating the determination upon the adjusted signals. One form of such adjustment may be performed as follows:

A signal representation may be retained as, or converted to, its complex Fourier transform. Such transform may further be represented in polar form, as the pair of real-valued functions $\{M(f), \theta(f)\}$, where $M(f)$ represents the modulus of the signal at frequency $f$, and $\theta(f)$ represents its angle. Adjustment may then be performed by manipulating $\theta(f)$ only, to form $\theta_2(f)$. The Fourier transform of the adjusted signal may then be taken as $\{M(f), \theta_2(f)\}$, from which the time function of the adjusted signal may be derived by the inverse Fourier transform.

$\theta_2(f)$ may be derived from $\theta(f)$ by:

$$\theta_2(f) = \theta(f) + 2\pi \frac{d}{V_0}(f - \sqrt{f \cdot f_0}) \quad (1)$$

where:
  d represents the distance from the location of the sensor in question to the current best determination of the touch location,
  $V_0$ represents the typical speed of propagation being assumed, and
  $f_0$ represents the frequency corresponding to $V_0$.

$f_0$ may be a predetermined frequency at the center of a passband chosen for signal analysis. Alternatively, it may be chosen to correspond to the peak of signal energy in the time segment of the signals currently being analyzed In either case, it may be maintained at the same value for any signal segment being analyzed for a touch location by the iterative method described here. $V_0$ may be a known function of $f_0$, based upon the pre-established characteristics of the touch plate. As one or more cycles of phase correction are performed, $V_0$ becomes the effective propagation velocity of the dispersion-free corrected representation. Note that if the refinement procedure described here is carried out for more than one cycle, it is only the value of d that is updated on the right side of Equation 1. $\theta_2(f)$ is repeatedly redefined to achieve a more accurate touch location, but it is the original $\theta(f)$, combined with an improved value of d, that is used for this purpose. Note that if there are four sensors employed, there are four signal segments to adjust in each iteration, accomplished with four applications of Equation 1. Each has its own distance d from the estimated touch point, and its own $\theta(f)$ values.

Equation 1 adjusts the direct-arrival signals from the touch disturbance to what they would have been, had the touch panel been a non-dispersive medium of propagation speed $V_0$, subject to the following assumptions:

First, that the distance d is correct. If, however, an inaccurate value of d is used that is an improvement over the previous iteration, a reduction in the adjusted dispersion may be expected, then to be followed by a more accurate location computation. Note that the first location estimate may be computed implicitly assuming d=0 for each sensor, thus the second location may be expected to yield a large improvement.

Second, that the velocity of propagation is proportional to the square root of the frequency. Alternatives to Equation 1 may be applied to deal with other dispersion characteristics.

Figure 7:
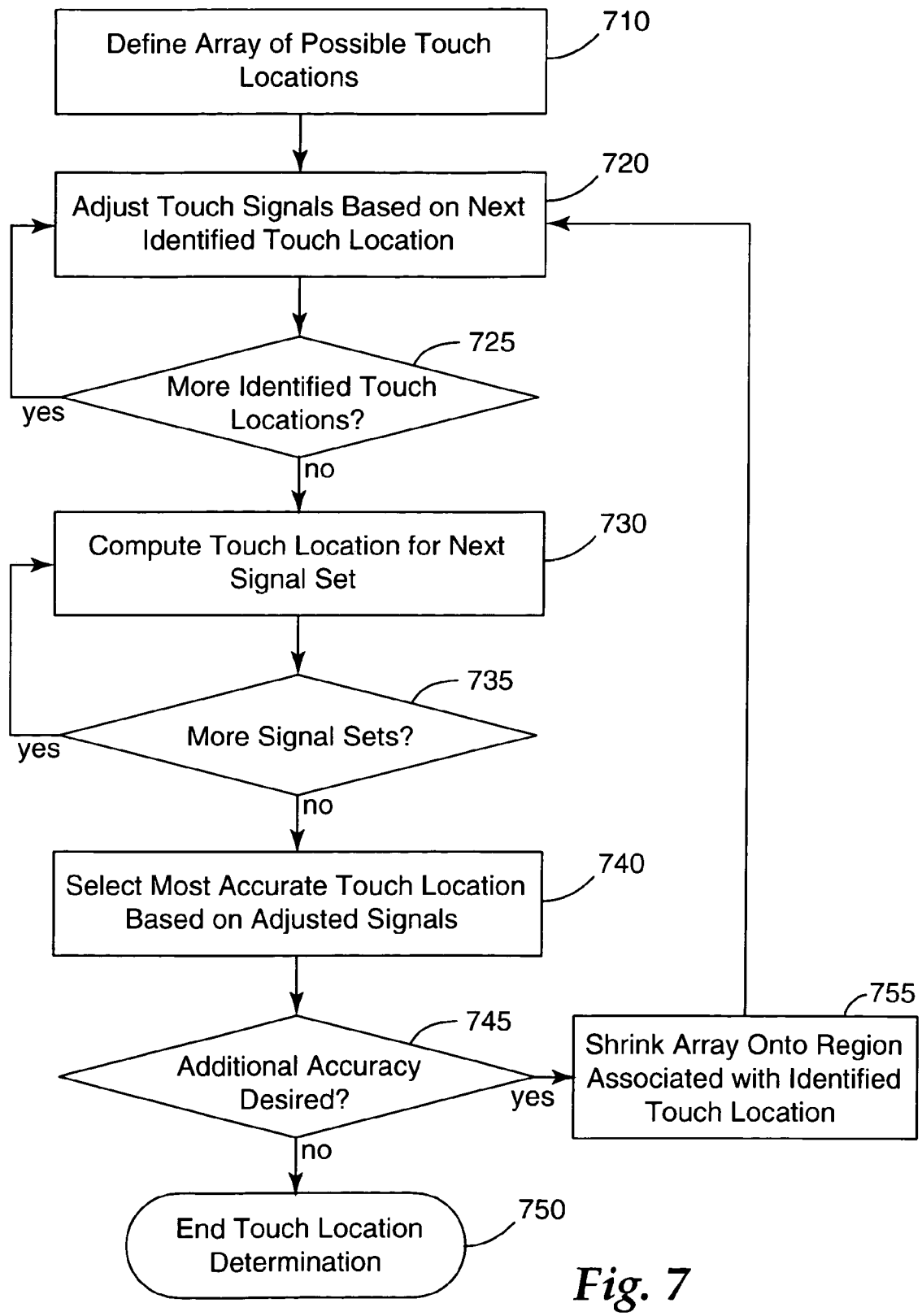

One embodiment of the invention involves expanding the process outlined above into the procedure illustrated by the flowchart of FIG. 7. Define 710 an n-by-m rectangular array of possible touch regions, such that this array is initially sized and centered to just cover the whole active touch area. Touch signals received are adjusted 720 for each of these possible touch regions in turn 725; that is, as though the touch in each case were already known to have taken place at the center of the associated region. The touch location computation is then attempted 730 for all 735 n times m adjusted signal sets. Of those computations returning a location within their associated regions, or within a predetermined distance thereof, that one is retained 740 which shows the greatest probable accuracy by some measure. For technologies based upon time-of-flight, for example, such a measure may be constructed to reflect the degree of apparent impulsivity of the adjusted signals. Alternatively, it may be constructed to reflect the presence of single, compact features in the cross-correlations of the adjusted signals. If the location so computed is deemed 745 to be of sufficient accuracy, this value is returned and the touch location process is complete 750. If the location so computed is not yet sufficiently accurate 745, shrink 755 the area represented by the n-by-m array, and re-center the shrunken array on the newly computed location. The process continues as illustrated by blocks 720-745 until the desired or required accuracy is achieved.

Figure 8A:
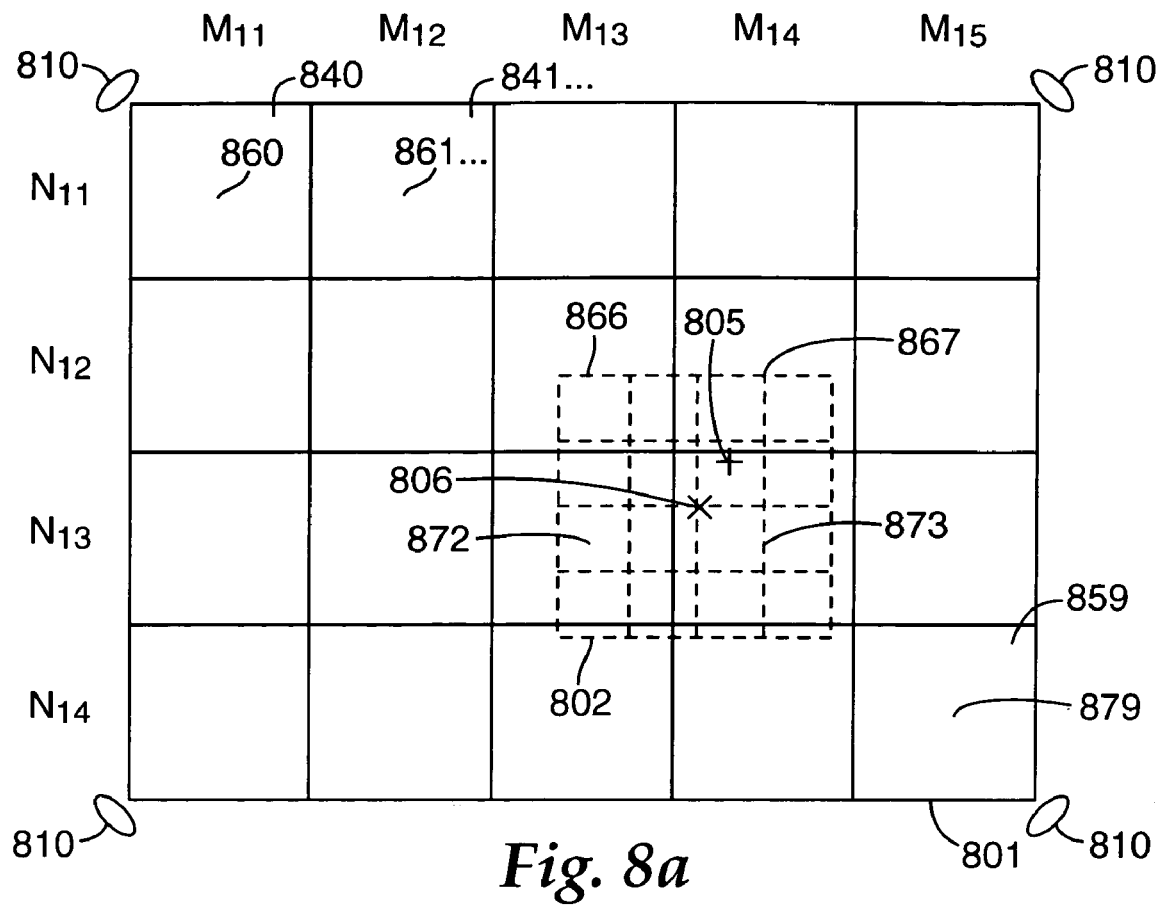
FIGS. 8a and 8b are diagrams illustrating a method of touch location determination for a touch panel having possible touch locations defined by an n×m array in accordance with embodiments of the invention.

This process is illustrated for an array with n=4 and m=5 by the diagram of FIG. 8a. The array dimensions were arbitrarily selected and an array used for touch location determination may have more or fewer elements than the 4×5 array used in this example. FIG. 8a illustrates a 4×5 rectangular array including rows $N_{11}$ to $N_{14}$ and columns $M_{11}$ to $M_{15}$ centered on a touch surface 801. The array defines points 860-879 that are centers of associated regions 840-859. The points 860-879 define the locations with respect to which phase corrections will be performed for the first iteration. A touch occurs at location 805 causing vibrations in the touch surface that are detected by sensors 810 positioned at corners of the touch surface. Data received by sensors 810 are adjusted for each of these possible touch regions 840-859 in turn; that is, as though the touch in each case were already known to have taken place at the center of the associated region.

The touch location computation is then attempted for all adjusted signal sets. In the example illustrated by FIG. 8a, the actual touch location 805 falls within region 853. The touch-location computation based on data phase-adjusted for center 873 then may fall, for example, at point 806. The touch locations computed with respect to corrections for nearby centers 866, 867, and 872 will also tend to cluster in the vicinity of touch point 805, but are likely to be associated with a lower estimate of probable accuracy. Therefore, touch location estimate 806 is selected as the output of the first cycle of the iterative process, and may be used for the center of a second cycle of iteration, if this first estimate is not deemed sufficiently accurate.

Figure 8B:
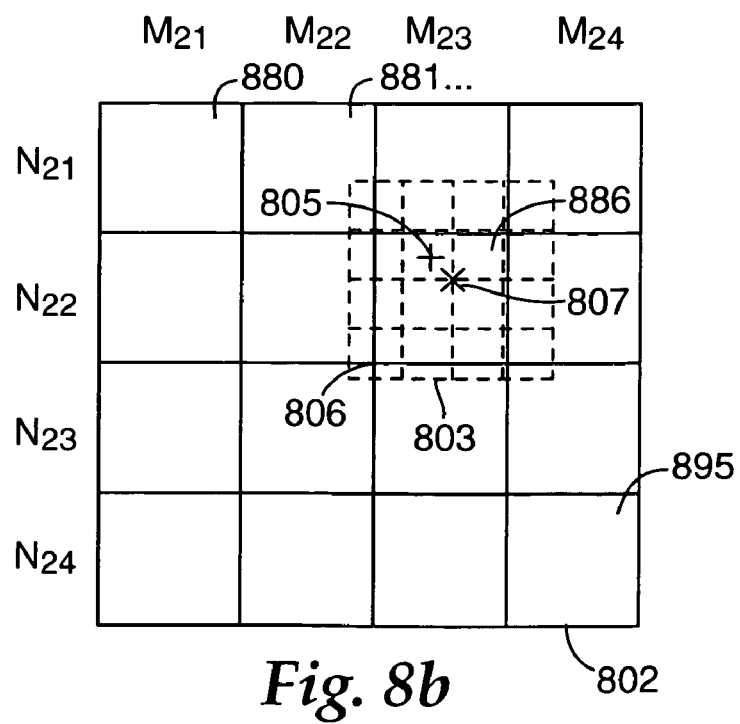

For such a second cycle, an array of possible touch location regions 802 may be centered on the previous best-estimate touch point 806 as illustrated at FIG. 8b. The process of iteratively identifying successively smaller regions associated with the highest touch location accuracy and imposing a matrix of possible touch locations may continue until a desired touch location accuracy is achieved. The dimensions of an array used for any particular iteration may be the same as or different from the dimensions used for previous iterations. In the example presented in FIG. 8b, the dimensions of the array for the second iteration are 4×4. FIG. 8b illustrates this 4×4 rectangular array including rows $N_{21}$ to $N_{24}$ and columns $M_{21}$ to $M_{24}$ centered on point 806. Array 802 may be sized to be somewhat larger, such as 1.5 times larger, than the individual regions of the previous iteration. This may assure that the true touch location is not lost off the edge of the reduced array in cases where remaining imprecision has mislocated the touch over a region boundary.

The array 802 comprises regions 880-895. The signals received at the sensors 810 are adjusted for the centers of each of these. The calculation adjusted for the center point of region 886 is associated with the lowest estimate of likely error, and produces touch location estimate 807.

If the touch location determination is of sufficient accuracy, the process may terminate returning point 807 as the touch location. If greater accuracy is desired or required, an array of possible touch locations 803 may be centered on point 807 and the process may be repeated.

The methods of the invention involving performing iterative calculations to enhance touch location accuracy may be applied in other contexts and are not limited to the specific embodiments described above. For example, touch may be located by measuring the perpendicular forces needed to support the corners of an overlay plate, then applying the laws of static equilibrium to changes in these forces. As the overlay gets too large or flexible, its lowest mode of vibration may cause errors when excited by a touch. These errors may be avoided, if the excitation of the resonance can be estimated, and the resulting inertial effects subtracted from the signals. A procedure for accomplishing this error correction when the touch surface is fully rigid and the unwanted vibrations arise from a flexible support is described in U.S. Pat. No. 5,563,632 which is incorporated herein by reference. In the case of a flexible overlay, however, the relationship between the excitation and the touch location is more complex. In particular, attempts at correction may benefit substantially from some foreknowledge of the touch location. Since the inertial errors are typically small compared to the overall size of the touch surface, an initial computation of location may be used in estimating the inertial errors, which may then be subtracted from the signals to allow a more accurate location to be computed.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for detecting a touch location on a touch sensitive device having a touch plate and a plurality of vibration sensors configured to sense vibrations propagating in the touch plate, the method comprising:
   generating signals responsive to the vibrations, the vibrations caused by a touch to the touch plate; and
   determining the touch location, comprising:
      defining an array of initial touch locations, the array sized to cover a portion of an active area of the touch plate;
      adjusting the signals using each of the initial touch locations;
      approximating the touch locations as one of the initial touch locations based on the signals adjusted using the initial touch locations;
      defining one or more additional arrays sized to cover a smaller portion of the active area;
      adjusting the signals using the approximate touch location; and
      determining the touch location using the signals adjusted using the approximate touch location.

2. The method of claim 1, wherein determining the touch location comprises iteratively determining the touch location.

3. The method of claim 2, wherein iteratively determining the touch location comprises iteratively determining the touch location to a predetermined touch location accuracy.

4. A method for detecting a touch location on a touch sensitive device having a touch plate and a plurality of vibration sensors configured to sense vibrations propagating in the touch plate, the method comprising:
   generating signals responsive to the vibrations, the vibrations caused by a touch to the touch plate; and
   iteratively determining the touch location, comprising:
      approximating the touch location;
      adjusting the signals toward an exact reconstruction using the approximate touch location; and
      determining the touch location using the adjusted signals.

5. The method of claim 1, wherein defining the one or more additional arrays comprises defining the one or more additional arrays based on an initial touch location associated with a more accurate adjusted signal.

6. The method of claim 1, wherein:
   defining the array of initial touch locations comprises defining a plurality of touch regions; and
   adjusting the signals using approximate touch locations comprising adjusting the signals based on at least one point within each of the touch regions.

7. The method of claim 1, wherein the array of initial touch locations is sized to cover the active area of the touch plate.

8. A method for detecting a touch location on a touch sensitive device having a touch plate and a plurality of vibration sensors configured to sense vibrations propagating in the touch plate, the method comprising:
   generating signals responsive to the vibrations, the vibrations caused by a touch to the touch plate;
   defining a plurality of touch regions;
   adjusting the signals based on at least one point within each of the touch regions; and determining the touch location based on adjusted signals that provide a location within a predetermined distance of an associated touch region and based on a measure of probable accuracies of the adjusted signals.

9. The method of claim 1, wherein approximating the touch location comprises approximating the touch location based on arrival times of the vibrations at each of the vibration sensors.

10. The method of claim 1, wherein:
adjusting the signals comprises adjusting a phase of the signals at a selected frequency; and
determining the touch location comprises determining the touch location using the phase-adjusted signals.

11. A method for detecting a touch location on a touch sensitive device having a touch plate and a plurality of vibration sensors configured to sense vibrations propagating in the touch plate, the method comprising:
generating signals responsive to the vibrations, the vibrations caused by a touch to the touch plate;
approximating the touch location;
adjusting the signals using the approximate touch location including adjusting a phase of the signals at a selected frequency; and
determining the touch location using the adjusted signals, wherein the selected frequency is phase-adjusted with respect to a center frequency of a frequency passband.

12. A method for detecting a touch location on a touch sensitive device having a touch plate and a plurality of vibration sensors configured to sense vibrations propagating in the touch plate, the method comprising:
generating signals responsive to the vibrations, the vibrations caused by a touch to the touch plate;
approximating the touch location;
adjusting the signals using the approximate touch location including adjusting a phase of the signals at a selected frequency; and
determining the touch location using the adjusted signals, wherein the selected frequency is phase-adjusted with respect to a frequency associated with a peak signal energy.

13. A touch sensing device, comprising:
a touch plate;
a plurality of touch sensors coupled to the touch plate, the touch sensors configured to generate signals responsive to vibrations caused by a touch on the touch plate; and
a touch location processor coupled to the plurality of sensors and configured to define an array of initial touch locations, the array sized to cover a portion of an active area of the touch plate, define one or more additional arrays sized to cover a smaller portion of the active area, adjust the signals using each of the initial touch locations, approximate the touch location as one of the initial touch locations using the adjusted signals, adjust the signals using the approximate touch location, and determine the touch location using the signals adjusted using the approximate touch location.

14. The device of claim 13, wherein:
the touch plate comprises a frequency dispersive medium; and
the touch location processor is configured to correct the signals for frequency dispersion.

15. The device of claim 13, wherein the plurality of touch sensors comprises a plurality of piezoelectric sensors.

16. The device of claim 13, wherein the touch location processor is configured to iteratively define approximate touch locations and adjust the signals based on the approximate touch locations to determine the touch location.

17. The device of claim 13, wherein the initial array is sized to cover the active area of the touch plate.

18. The device of claim 13, wherein the processor is configured to determine the touch location based on a measure of probable accuracies of the adjusted signals.

19. The device of claim 13, wherein the processor is configured to adjust a phase of the signals at a selected frequency and determine the touch location using the phase-adjusted signals.

20. The device of claim 13, further comprising a display coupled to the touch sensitive device.

21. The device of claim 13, further comprising:
a display coupled to the touch sensitive device; and
a host processor coupled to the display and the touch sensitive device.

* * * * *

UNITED STATES PATENT AND TRADEMARK OFFICE
CERTIFICATE OF CORRECTION

PATENT NO. : 7,499,039 B2  Page 1 of 1
APPLICATION NO. : 11/032572
DATED : March 3, 2009
INVENTOR(S) : Jerry B. Roberts It is certified that error appears in the above-identified patent and that said Letters Patent is hereby corrected as shown below:

<u>Column 2</u>

Line 31; delete "1 $a$" and insert -- $1a$ -- therefore.

<u>Column 12</u>

Line 20; delete "locations as" and insert -- location as -- therefore.
Line 53 – 54; delete "using approximate touch locations comprising" and insert
-- using the approximate touch location comprises -- therefore.

Signed and Sealed this

Fifth Day of May, 2009

JOHN DOLL
*Acting Director of the United States Patent and Trademark Office*